(12) United States Patent
Langfelder et al.

(10) Patent No.: US 11,906,306 B2
(45) Date of Patent: Feb. 20, 2024

(54) INERTIAL MEASUREMENT CIRCUIT, CORRESPONDING DEVICE AND METHOD

(71) Applicant: STMicroelectronics S.r.l., Agrate Brianza (IT)

(72) Inventors: Giacomo Langfelder, Milan (IT); Leonardo Gaffuri Pagani, Sesto san Giovanni (IT); Luca Guerinoni, Alzano Lombaro (IT); Luca Giuseppe Falorni, Limbiate (IT); Patrick Fedeli, Senago (IT); Paola Carulli, Bari (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 66 days.

(21) Appl. No.: 17/750,074

(22) Filed: May 20, 2022

(65) Prior Publication Data
US 2022/0390234 A1 Dec. 8, 2022

(30) Foreign Application Priority Data
Jun. 4, 2021 (IT) .................. 102021000014621

(51) Int. Cl.
*G01C 19/5776* (2012.01)
*G01C 19/5712* (2012.01)

(52) U.S. Cl.
CPC ..... *G01C 19/5712* (2013.01); *G01C 19/5776* (2013.01)

(58) Field of Classification Search
CPC .................. G01C 19/5712; G01C 19/5776
See application file for complete search history.

(56) References Cited

U.S. PATENT DOCUMENTS 5,400,269 A 3/1995 White et al.
8,156,806 B1 * 4/2012 Cardarelli ............ G01C 21/166
73/504.04

(Continued)

FOREIGN PATENT DOCUMENTS

CN 107504964 B 12/2017

OTHER PUBLICATIONS

Trusov, A. A., "Overview of MEMS Gyroscopes: History, Principles of Operations, Types of Measurements," MicroSystems Laboratory, Mechanical and Aerospace Engineering, UC Irvine, May 10, 2011, 15 pages.

(Continued)

*Primary Examiner* — David J Bolduc
(74) *Attorney, Agent, or Firm* — Slater Matsil, LLP

(57) ABSTRACT

In an embodiment a circuit includes an inertial measurement unit configured to be oscillated via a driving signal provided by driving circuitry, a lock-in amplifier configured to receive a sensing signal from the inertial measurement unit and a reference demodulation signal which is a function of the driving signal and provide an inertial measurement signal based on the sensing signal, wherein the reference demodulation signal is affected by a variable phase error, phase meter circuitry configured to receive the driving signal and the sensing signal and provide, as a function of a phase difference between the driving signal and the sensing signal, a phase correction signal for the reference demodulation signal and a correction node configured to apply the phase correction signal to the reference demodulation signal so that, in response to the phase correction signal being applied to the reference demodulation signal, the phase error is maintained in a vicinity of a reference value.

20 Claims, 2 Drawing Sheets

(56) References Cited

U.S. PATENT DOCUMENTS

| | | | |
|---|---|---|---|
| 11,466,986 B2* | 10/2022 | Dakshinamurthy | G01C 19/5776 |
| 2007/0052456 A1* | 3/2007 | Watson | H03L 7/06 327/365 |
| 2013/0099836 A1* | 4/2013 | Shaeffer | H03L 7/0893 327/147 |
| 2013/0199294 A1* | 8/2013 | Townsend | G01C 19/56 73/504.13 |
| 2018/0209816 A1* | 7/2018 | Hodjat-Shamami | G01C 19/5684 |
| 2019/0186950 A1 | 6/2019 | Dakshinamurthy et al. | |
| 2019/0310106 A1* | 10/2019 | Furuta | G01C 19/5776 |
| 2020/0400434 A1 | 12/2020 | Guerinoni et al. | |
| 2021/0033396 A1 | 2/2021 | Scafidi et al. | |

OTHER PUBLICATIONS

Facchinetti, S., et al., "Development of a complete model to evaluate the Zero Rate Level drift over temperature in MEMS Coriolis Vibrating Gyroscopes," 2017 IEEE International Symposium on Inertial Sensors and Systems (Inertial), doi:10.1109/ISISS.2017.7935673, Mar. 27-30, 2017, 4 pages.

* cited by examiner

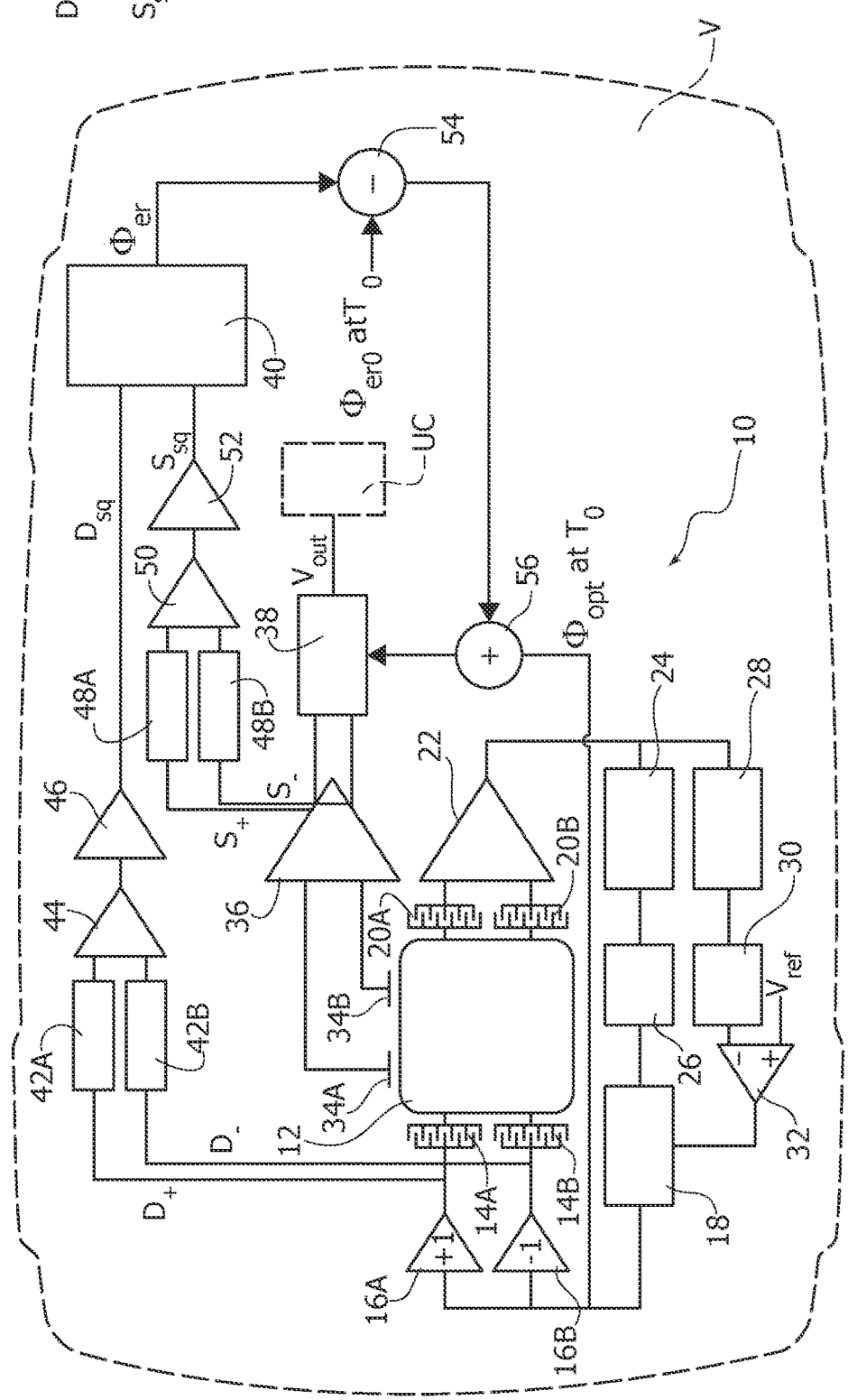

INERTIAL MEASUREMENT CIRCUIT, CORRESPONDING DEVICE AND METHOD

CROSS-REFERENCE TO RELATED APPLICATIONS

This application claims the benefit of Italian Application No. 102021000014621, filed on Jun. 4, 2021, which application is hereby incorporated herein by reference.

TECHNICAL FIELD

The description relates to inertial measurement units (IMUs). The description further relates to micro-electro-mechanical-systems (MEMS) sensors (e.g., gyroscopes) that are examples of IMUs. Moreover, the description relates to automotive application and in particular to navigation systems.

BACKGROUND

Low-offset-drift performance is a desirable feature of inertial measurement units (IMUs) such as MEMS gyroscopes, for instance.

Nowadays, MEMS gyroscopes are used in a wide range of products such as consumer products, including augmented reality/virtual reality (AR/VR) applications, automotive and conveyance (navigation) as well as other high-end applications where offset stability is a point of interest.

Leakage of "quadrature" offset into the output channel of gyroscopes, as caused by phase errors, may adversely affect stability performance.

This issue can be addressed minimizing the quadrature value. This can be done electronically or electro-mechanically. Whatever the approach adopted, compensation is not complete, with a residual drift remaining caused by drifts in the phase error.

Byway of general background (and as known to those of skill in the art), gyroscopes are used to detect an angular (rotation) rate with high accuracy (low offset drifts) representing a desired feature.

As schematically represented in FIG. 1, a major source of offset drift is recognized to be the leakage of undesired quadrature motion, $\Omega q$ into the sense channel.

This can be minimized by coherent demodulation. However, the demodulation phase is affected by errors $\Phi err$, which vary with temperature (T) and result in an output offset $\Omega q \cdot \Phi err(T)$.

Acting directly on the system to compensate the quadrature $\Omega q$ has certain benefits. However, compensation is not perfect and a residual quadrature $\Omega qr$ remains, so that a residual error $\Omega qr \cdot \Omega err(T)$ remains and its drift adversely affects gyroscope performance.

Various approaches have been proposed to address this issue.

For instance, the quadrature component may be attempted to be minimized using current injection at the analog front-end, e.g., $\Omega qr \cdot \Omega err(T) - \Omega comp$.

A drawback of this approach lies in that it leaves a residual quadrature error, and thus an offset. In fact, absent a perfect matching between quadrature and its compensation phase, a residual error appears, proportional to the phase error ($\Omega err$). Additionally, drifts remain largely non-compensated.

Another approach may involve minimizing the quadrature component by using closed-loop electro-mechanical compensation, e.g., $(\Omega q - \Omega comp) \cdot \Omega err(T)$ A drawback of this approach lies in that it compensates quadrature at its source, leaving in any case a residual uncompensated term and thus associated drifts.

Still another approach may involve minimizing the phase error drifts by changing the phase, relying on linearized phase v. temperature models, e.g., $\Omega q[(\Omega err(T) - \Omega model(T)]$.

A drawback of this approach lies in that it relies on linearized models, while the behavior of real systems is non-linear (it changes from part to part), and does not consider other effects that contribute to the phase drift (sense softening, drive hardening, deformations).

The problem of enhancing zero rate level (ZRL) stability over system lifetime is thus still extensively felt.

Solutions facilitating higher ZRL stability without limiting the noise and power consumption performance are thus desirable.

SUMMARY

Embodiments provide inertial measurement units (IMUs). Further embodiments provide micro-electro-mechanical-systems (MEMS) sensors (e.g., gyroscopes) that are examples of IMUs. Yet other embodiments refer to automotive applications and in particular to navigation systems. Embodiments may address the issues discussed above.

According to one or more embodiments, a circuit may have the features set forth in the following.

A circuit based on a MEMS (micro-electro-mechanical-systems) gyroscope may be exemplary of such a circuit.

One or more embodiments relate to a corresponding device.

Various types of consumer products such as, for instance, augmented reality/virtual reality (AR/VR) viewers, navigation devices for the automotive sector that include user circuitry exploiting the output from an IMU may be exemplary of such a device.

One or more embodiments relate to a corresponding method.

The claims are an integral part of the technical teaching provided herein in respect of the embodiments.

Examples as discussed herein may offer one or more of the following advantages:

- The phase error can be kept at any time close to zero, thanks to an underlying feedback mechanism; as a consequence, whatever the quadrature value, none of its components will leak into the signal channel;
- In certain embodiments, a solution as discussed herein can be combined with other compensation mechanisms and provide further improved overall compensation;
- A closed-loop approach is used that, on the one hand, keeps the phase errors close to zero, and, on the other hand, does this irrespective of the variability of, e.g., gyroscope parameters, which makes the temperature ("T") dependence different from part to part;
- In certain embodiments as applied, for instance, to a gyroscope, no need exists for a compensation at the gyroscope level; this is a significant advantage over conventional techniques.

Examples as discussed herein propose a closed-loop compensation method to improve the zero-rate output (ZRO) stability performance of amplitude-modulated (AM) capacitive MEMS gyroscopes.

Examples as discussed herein rely on a direct measurement (and closed-loop compensation) of the variation of the relative phase between a quadrature signal, modulated by a drive carrier frequency, and a demodulation reference.

In examples as discussed herein, a closed-loop arrangement includes a phase meter that acts on the phase of the lock-in amplifier in a sense-mode, open-loop, demodulation chain.

Examples as discussed herein can be applied in MEMS gyroscopes, for use in the automotive sector or in augmented reality/virtual reality (AR/VR) applications.

Examples as discussed herein can be applied to otherwise conventional gyroscopes and inertial measurement units (IMUs) such as 6x IMUs, with the capability of representing an enhancement of "mainstream" inertial MEMS products.

Examples as discussed herein do not involve substantial changes in the electro-mechanical design of such conventional products.

Examples as discussed herein may include additional (analog) stages taking signals out of the drive/sense chains and squaring them. For instance, these may include twin paths implementing bandpass filter (BPF) stages (with related passive components) operating at the gyroscope working frequencies.

Other additional (analog) stages and related signals may be present in a path towards the lock-in amplifier (LIA) reference along with a phase meter.

In operation, examples as discussed herein may produce output tones related to the periodical activation of a compensation feature.

Also, in certain examples, periodical changes can be detected in the sign of the voltage applied to MEMS quadrature compensation electrodes.

BRIEF DESCRIPTION OF THE DRAWINGS

One or more embodiments will now be described, by way of example only, with reference to the annexed figures, wherein:

FIG. 3 shows a block diagram illustrative of a circuit according to embodiments; and FIG. 4 shows a time diagram illustrative of possible time behaviors of signals which may occur in embodiments.

Figure 1:
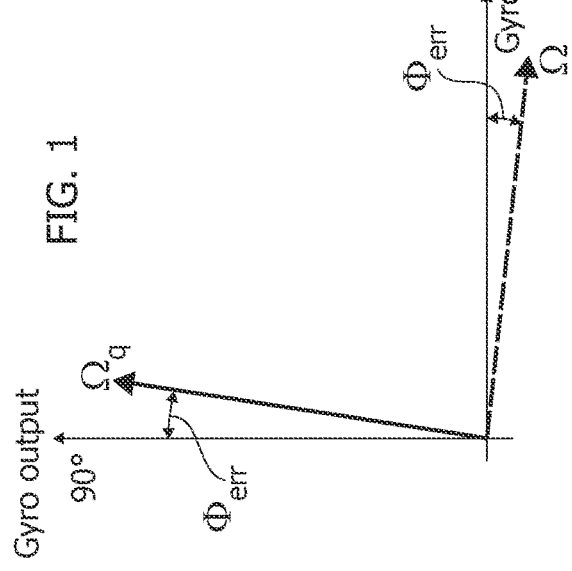
FIG. 1 shows a representation of a gyro output.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

In the ensuing description, various specific details are illustrated in order to provide an in-depth understanding of various examples of embodiments according to the description. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", or the like, that may be present in various points of the present description do not necessarily refer exactly to one and the same embodiment. Furthermore, particular configurations, structures, or characteristics may be combined in any adequate way in one or more embodiments.

The headings/references used herein are provided merely for convenience and hence do not define the extent of protection or the scope of the embodiments.

For the sake of brevity and simplicity, a same designation may be used in the following to designate both a certain circuit node or line and a signal (a voltage signal, for instance) occurring at that node or line.

By way of general introduction to the instant detailed description, reference may be had to document US 2020/0400434 A1. That document discloses a MEMS gyroscope having a mobile mass carried by a supporting structure to move in a driving direction and in a first sensing direction, perpendicular to each other.

The structure of such a gyroscope will be assumed to be generally known to those of skill in the art. A detailed description will not be repeated here for brevity.

For the purposes herein one may briefly recall the principle underlying operation of such gyroscopes: a vibrating body tends to continue vibrating in a same plane even if its support is caused to rotate. Due to the Coriolis effect, the vibrating body exerts an apparent force on the support. The rate of rotation can be determined by measuring the displacement produced by that force.

Reliable and inexpensive vibrating structure gyroscopes can be manufactured with MEMS technology. These are used in mobile communication devices, electronic games, cameras and various other applications.

An overview of MEMS gyroscope technology is provided in A. A. Trusov: "Overview of MEMS Gyroscopes: History, Principles of Operations, Types of Measurements" MicroSystems Laboratory, Mechanical and Aerospace Engineering University of California, Irvine, CA, 92697, USA May 10, 2011 (see uci.edu).

Also, S. Facchinetti, L. Guerinoni, L. G. Falorni, A. Donadel and C. Valzasina, in: "Development of a complete model to evaluate the Zero Rate Level drift over temperature in MEMS Coriolis Vibrating Gyroscopes" 2017 *IEEE International Symposium on Inertial Sensors and Systems (INERTIAL)*, 2017, pp. 125-128, doi:10.1109/ISISS.2017.7935673 present a comprehensive model to analytically estimate the Zero Rate Level (ZRL) variation over temperature in micromachined Coriolis Vibratory Gyroscopes (CVG) with associated electronics, with the goal of providing solid guidelines for the development of high-stability MEMS Inertial Measurement Units (IMUs).

The examples presented herein rely on a compensation method based on the direct measurement of the phase error Φerr.

Specifically, the method as exemplified exploits the quadrature channel to recover the phase information.

It was noted that the quadrature channel signal is oftentimes (much) larger than the rate full-scale signal.

This may be particularly the case if embedded quadrature compensation electrodes are used to decompensate the phase, on purpose. These were found to be easy to increase, "chop" or modulate in order to increase the resolution in phase measurement.

Various implementation options can be considered.

In certain examples, no compensation electrodes are provided, and the measurement relies on the quadrature signal that is (unavoidably) present in the system output.

In other examples, with the provision of quadrature compensation electrodes, quadrature can be deliberately increased (or modulated) to facilitate phase measurements.

In either case, the procedure can be applied in continuous-time mode or at certain times only (every now and then) having regard to the temperature drift transients involved.

An underlying principle is thus to aim at keeping null (zero), continuously, via a closed-loop feedback, the term $\Phi err$, so that the offset and its associated drifts are nulled.

Figure 2:
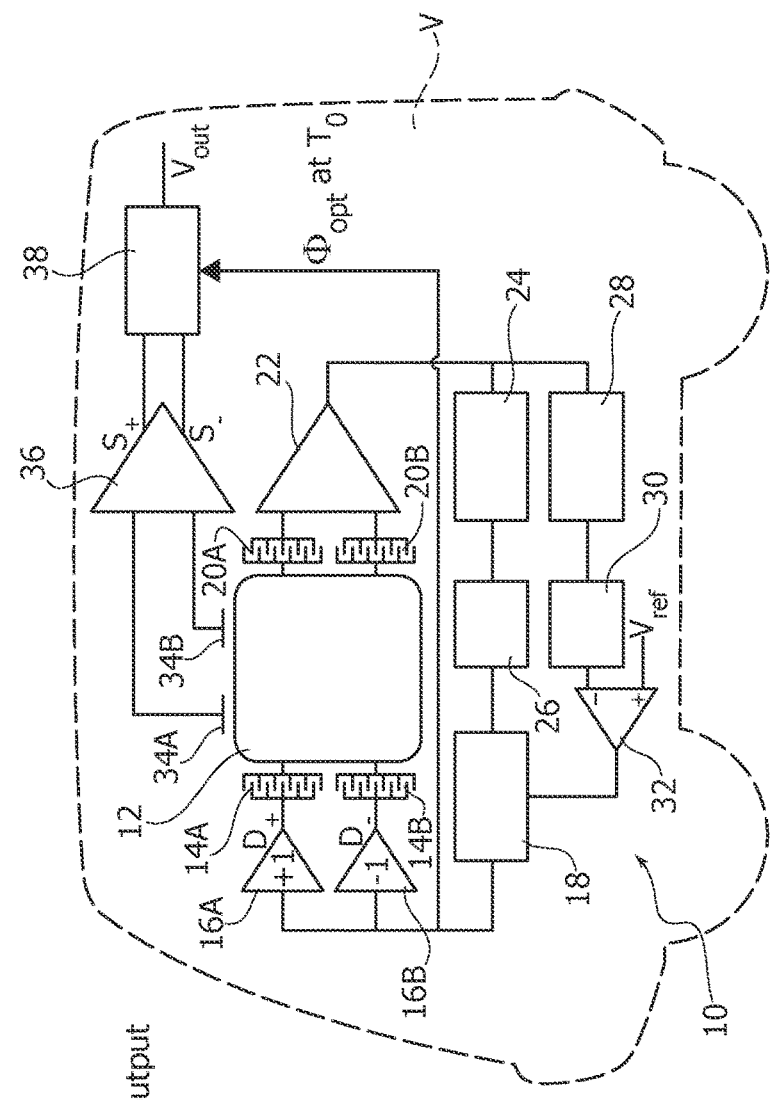
FIG. 2 shows a block diagram of a circuit according to examples discussed in the present description.

In a conventional, uncompensated configuration as exemplified in FIG. 2 (like in the case of FIG. 3, installation on board a vehicle V is considered by way of example) a circuit 10 as considered herein comprises (de facto is built around) a MEMS gyroscope 12 (of any known type suited for the purposes herein).

During a drive mode the gyroscope 12—represented here in a deliberately simplified manner—is sustained in oscillation along a driving direction (which may be assumed to be horizontal in the figure) via a primary phase loop comprising first electrodes 14A, 14B driven by drive stages 16A ($D_+$) and 16B ($D_-$) in turn coupled to a variable gain amplifier (VGA) 18.

Second electrodes 20A, 20B sensitive to the oscillation in the driving direction produce signals that are applied to a differential stage 22 which supplies a phase regulator/gain stage 24, 26. The output from the gain stage closes the loop to the MEMS 12 via the variable gain amplifier 18.

Oscillation sustained via the primary phase loop just discussed is precisely controlled in amplitude by an automatic gain control (AGC) negative feedback loop comprising a rectifier circuit 28 coupled to the output from the differential amplifier stage 22.

The output from the rectifier circuit 28 is applied, via a low-pass filter 30, to a first input (inverting, for instance) of a comparator 32 having its second input (non-inverting, for instance) coupled to a reference voltage Vref.

The output from the comparator 32 in turn controls the gain of the variable-gain amplifier 18.

As illustrated, sensing in the sensing direction (which may be assumed to be vertical in the figures) is via an open loop chain, including third electrodes 34A, 34B.

The signals produced by the third electrodes 34A, 34B are applied to a fully differential stage 36 which supplies differential output signals $S_+$, $S_-$ to a lock-in amplifier (LIA) 38 which produces the desired output signal Vout.

A LIA is an amplifier capable of extracting a signal with known carrier from a (quite) noisy environment. It can be implemented as a homodyne detector having cascaded an adjustable low-pass filter.

As illustrated in FIG. 2, the LIA 38 uses a demodulation reference signal $\Phi opt$ taken from the drive loop (e.g., from the output of the variable-gain amplifier 18).

In FIG. 2, the phase of this signal is designated $\Phi opt$ at $T_o$ in order to highlight the fact that its phase value is the one reached at a certain temperature $T_o$, and may thus be exposed to variations as a function of temperature.

Those of skill in the art will otherwise appreciate that the conventional implementation illustrated in FIG. 2 is merely exemplary.

A variety of alternative implementations are possible both for the driving chain and for the sensing chain associated with the gyroscope 12: in fact, the examples provided herein are largely "transparent" to the specific implementation of the driving chain and/or the sensing chain.

It is noted that, in principle, an "optimum" demodulation phase can be calibrated (finding $\Phi opt$ in a reference condition). Drifts in $\Phi opt$, due both to the mechanical elements (the MEMS gyroscope 12, primarily) and the electronic elements in the driving and sensing chains will adversely affect the output signal Vout in operation.

The principles underlying the embodiments are exemplified in FIG. 3.

As noted, corresponding numerals and symbols in the different figures generally refer to corresponding parts unless otherwise indicated. Consequently, parts or elements like parts or elements already discussed in connection with FIG. 2 are indicated by like numerals and symbols in FIG. 3, and a corresponding description will not be repeated for brevity.

It will be otherwise appreciated that a certain part or element being designated by like numerals or symbols in FIG. 2 and FIG. 3 does not imply that such a part or element is necessarily implemented in the same way in FIG. 2 and FIG. 3.

Also, in FIG. 3, user circuitry is illustrated, designated UC.

This may be any type of circuitry configured to exploit the inertial measurement (gyroscopic) output signal Vout, in a product such as, for instance, an augmented reality/virtual reality (AR/VR) viewer, a navigation device for the automotive sector, for instance.

As illustrated in FIG. 3, a phase meter 40 is provided to measure a phase difference $\Phi er$ between a signal $D_{sq}$ indicative of the "driving phase" and a signal $S_{sq}$ indicative of the "sensing phase".

As illustrated in FIG. 3, the signal $D_{sq}$ is sensed across the first electrodes 14A, 14B ($D_+$, $D_-$), e.g., at the output of the drivers 16A, 16B, and transferred to the phase meter 40 (after possible bandpass filtering at 42A, 42B) via an instrumentation amplifier (INA) 44 and a high-gain (hiG) stage 46.

As likewise illustrated in FIG. 3, the signal $S_{sq}$ is sensed across the third electrodes 34A, 34B ($S_+$, $S_-$) and transferred to the phase meter 40 (after possible bandpass filtering at 48A, 48B) via an instrumentation amplifier (INA) 50 and a high-gain (hiG) stage 52.

The output from the phase meter 40 is a measure of the phase difference between the signals $D_{sq}$ and $S_{sq}$ (see $\Delta\Phi_{ds}$ in FIG. 4), denoted $\Phi er$ in FIG. 3.

A reference phase delay $\Phi er0$ at $T_o$ is added (with sign, namely subtracted) to the output of the phase meter 40 at a trimming node 54 and the result is used to correct the phase of the signal $\Phi opt$ at $T_o$ at a node 56.

The LIA phase regulator thus closes a feedback on the phase of the reference demodulation wave entering the lock-in amplifier 38, so that $\Phi er$ (the phase difference between the signals $D_{sq}$ and $S_{sq}$) is in the end kept close to $\Phi er0$ (a reference phase delay) by the feedback action.

Briefly, the exemplary circuit 10 of FIG. 3 comprises an inertial measurement unit 12 (a MEMS gyroscope, for instance) configured to be oscillated via a driving signal, e.g., the signals $D_+$, $D_-$ produced by the driving circuitry comprising the elements 14A, 14B, 16, 18, 20A, 20B, 22, 24, 26, 28, 30, and 32.

The lock-in amplifier 38 receives a sensing signal $S_+$, $S_-$ from the inertial measurement unit 12 as well as a reference demodulation signal that is a function of the driving signals $D_+$, $D_-$, which finally give rise to the signal Dsq.

The lock-in amplifier 38 is configured to produce the inertial measurement signal Vout based on the sensing signal $S_+$, $S_-$ from the inertial measurement unit 12 and the reference demodulation signal, which is affected by a variable phase error $\Phi er$.

The phase meter circuitry 40 is configured to receive the driving signal (D$_+$, D$_-$>>>Dsq) and the sensing signal (S$_+$, S$_-$>>>Ssq) and produce, as a function of the phase difference ΔΦds between the driving signal Dsq and the sensing signal Ssq (see FIG. 4) a phase correction signal (via the nodes 54, 56) for the reference demodulation signal of the lock-in amplifier 38.

A correction node such as 56 is provided configured to apply such a phase correction signal to the reference demodulation signal of the lock-in amplifier 38.

In response to the phase correction signal being applied to the reference demodulation signal of the lock-in amplifier 38, the associated phase error Φer is maintained in the vicinity of a (constant) reference value, namely Φer0.

A trimming node 54 can be provided intermediate the phase meter circuitry 40 and the correction node 56, with the trimming node 54 configured to trim the phase correction signal by a reference value Φer0 at T$_o$.

A circuit 10 as illustrated in FIG. 3 comprises sensing circuitry intermediate the inertial measurement unit 12 and the lock-in amplifier 38, the sensing circuitry including the electrodes 34A, 34B configured to produce the sensing signal S$_+$, S$_-$>>>Ssq.

As discussed in the following, while advantageous for reliability, such quadrature electrodes (and pads) are not mandatory and can be dispensed with, e.g., in an On/Act/On option combined with electronic compensation as discusses in the following.

As illustrated in FIG. 3, the sensing circuitry 34A, 34B, 36 can be configured to provide the sensing signal S$_+$, S$_-$>>>Ssq both to the lock-in amplifier 38 and to the phase meter 40.

Advantageously, the phase meter 40 can be implemented in the digital domain (see FIG. 4).

As illustrated in FIG. 3, the phase meter circuitry 40 is coupled to input signal paths for the driving signal D$_+$, D$_-$, Dsq and the sensing signal S$_+$, S$_-$, Ssq.

As illustrated, these input signal paths comprise:
bandpass filter circuitry (e.g., the filters 42A, 42B; 48A, 48B), and/or
saturation circuitry, optionally comprising a cascaded arrangement of an instrumentation amplifier such as 44 or 50 and a high-gain stage such as 46 or 52.

The LIA 38 with phase regulator can be implemented either in the analog or in the digital domain.

The pre-filtering (BPF) stages 42A, 42B, 48A, 48B, the INA amplifiers 44, 50 and the hiG stages 46 and 52 are analog stages.

As illustrated, pre-filtering (BPF) and saturation (INA+ hiG) are applied to the sensing and reference signals before (upstream) the phase meter. This is found to improve the resolution in phase measurements, reducing noise folding.

Architecture as exemplified in FIG. 3 lends itself to being used in various ways.

In an On/Act/Off approach, combined with electronic compensation, quadrature can be increased intentionally ("on" step) and the optimal phase measured and corrected ("act" step). In a last step, the intentional increase of the quadrature is removed and quadrature itself is again compensated ("off" step).

This option does not require, in principle, dedicated quadrature electrodes and pads.

In a stand-alone approach, applied continuously with quadrature modulation, quadrature can be again increased intentionally, with "chopping" applied at a frequency higher than the sensing bandwidth of the Coriolis channel. The modulated quadrature can be used to detect phase and apply a (continuous) correction.

Of course, this option involves quadrature electrodes and pads.

A further On/Act/Off approach, combined with electro-mechanical compensation, may be similar to the first approach discussed previously with quadrature again increased and compensated with electro-mechanical methods.

This (more reliable) option again involves quadrature electrodes and pads.

Examples as discussed herein thus improve the Zero Rate Output (ZRO) stability of inertial measurement units (IMUs) such as MEMS gyroscopes by intervening essentially at the hardware level.

Examples as discussed herein are however adapted to co-operate with adequate software in acting on the phase meter and the phase regulator (as exemplified by blocks 38 and 40 in FIG. 3).

It will be appreciated that arrangements as exemplified herein can be applied to multi-axis, multi-parameter IMUs, the instant description being deliberately simplified for the sake of explanation and understanding.

Without prejudice to the underlying principles, the details and embodiments may vary, even significantly, with respect to what has been described by way of example only, without departing from the extent of protection. The extent of protection is determined by the annexed claims.

What is claimed is:

1. A circuit comprising:
an inertial measurement unit configured to be oscillated via a driving signal provided by driving circuitry;
a lock-in amplifier configured to:
receive a sensing signal from the inertial measurement unit and a reference demodulation signal which is a function of the driving signal; and
provide an inertial measurement signal based on the sensing signal, wherein the reference demodulation signal is affected by a variable phase error;
phase meter circuitry configured to:
receive the driving signal and the sensing signal; and
provide, as a function of a phase difference between the driving signal and the sensing signal, a phase correction signal for the reference demodulation signal; and
a correction node configured to apply the phase correction signal to the reference demodulation signal so that, in response to the phase correction signal being applied to the reference demodulation signal, the phase error is maintained in a vicinity of a reference value.

2. The circuit of claim 1, further comprising a trimming node arranged between the phase meter circuitry and the correction node, wherein the trimming node is configured to trim the phase correction signal by a reference phase correction value.

3. The circuit of claim 1, further comprising sensing circuitry arranged between the inertial measurement unit and the lock-in amplifier, wherein the sensing circuitry is configured to provide the sensing signal.

4. The circuit of claim 3, wherein the sensing circuitry is configured to provide the sensing signal to both, the lock-in amplifier and the phase meter circuitry.

5. The circuit of claim 1, wherein the phase meter circuitry is coupled to input signal paths for the driving signal and the sensing signal, respectively, the input signal paths comprising:
bandpass filter circuitry; and/or
saturation circuitry.

6. The circuit of claim 5, wherein the saturation circuitry comprises a cascaded arrangement of an instrumentation amplifier and a high-gain stage.

7. The circuit of claim 1, wherein the phase meter circuitry comprises a digital phase meter.

8. The circuit of claim 1, wherein the inertial measurement unit comprises a MEMS gyroscope.

9. A device, comprising:
a circuit, comprising:
an inertial measurement unit configured to be oscillated via a driving signal provided by driving circuitry;
a lock-in amplifier configured to:
receive a sensing signal from the inertial measurement unit and a reference demodulation signal which is a function of the driving signal, and
provide an inertial measurement signal based on the sensing signal, wherein the reference demodulation signal is affected by a variable phase error;
phase meter circuitry configured to:
receive the driving signal and the sensing signal, and
provide, as a function of a phase difference between the driving signal and the sensing signal, a phase correction signal for the reference demodulation signal; and
a correction node configured to apply the phase correction signal to the reference demodulation signal so that, in response to the phase correction signal being applied to the reference demodulation signal, the phase error is maintained in a vicinity of a reference value; and
user circuitry coupled to the lock-in amplifier in the circuit,
wherein the user circuitry is configured to exploit the inertial measurement signal produced by the lock-in amplifier.

10. A method comprising:
oscillating an inertial measurement unit via a driving signal provided by driving circuitry;
receiving, by a lock-in amplifier, a sensing signal from the inertial measurement unit and a reference demodulation signal which is a function of the driving signal;
providing, by the lock-in amplifier, an inertial measurement signal based on the sensing signal and the reference demodulation signal, wherein the reference demodulation signal is affected by a variable phase error,
receiving, by a phase meter circuitry, the driving signal and the sensing signal, and providing, as a function of a phase difference between the driving signal and the sensing signal, a phase correction signal for the reference demodulation signal; and
applying, by a correction node, the phase correction signal to the reference demodulation signal of the lock-in amplifier so that, in response to the phase correction signal being applied to the reference demodulation signal of the lock-in amplifier, the phase error is maintained in a vicinity of a reference value.

11. The method of claim 10, further comprising trimming, by a trimming node, the phase correction signal by a reference phase correction value.

12. The method of claim 10, further comprising providing, by a sensing circuitry arranged between the inertial measurement unit and the lock-in amplifier, the sensing signal.

13. The method of claim 12, wherein the sensing circuitry provides the sensing signal to both, the lock-in amplifier and the phase meter circuitry.

14. The device of claim 9, wherein the circuit further comprises a trimming node arranged between the phase meter circuitry and the correction node, wherein the trimming node is configured to trim the phase correction signal by a reference phase correction value.

15. The device of claim 9, wherein the circuit further comprises sensing circuitry arranged between the inertial measurement unit and the lock-in amplifier, wherein the sensing circuitry is configured to provide the sensing signal.

16. The device of claim 15, wherein the sensing circuitry is configured to provide the sensing signal to both, the lock-in amplifier and the phase meter circuitry.

17. The device of claim 9, wherein the phase meter circuitry is coupled to input signal paths for the driving signal and the sensing signal, respectively, the input signal paths comprising:
bandpass filter circuitry; and/or
saturation circuitry.

18. The device of claim 17, wherein the saturation circuitry comprises a cascaded arrangement of an instrumentation amplifier and a high-gain stage.

19. The device of claim 9, wherein the phase meter circuitry comprises a digital phase meter.

20. The device of claim 9, wherein the inertial measurement unit comprises a MEMS gyroscope.

* * * * *